(12) United States Patent
Magarill et al.

(10) Patent No.: US 6,976,759 B2
(45) Date of Patent: *Dec. 20, 2005

(54) COMPOUND POLARIZATION BEAM SPLITTERS

(75) Inventors: Simon Magarill, Cincinnati, OH (US); Charles L. Bruzzone, Woodbury, MN (US); Stephen K. Eckhardt, White Bear Lake, MN (US); R. Edward English, Jr., Cincinnati, OH (US); E. Gregory Fulkerson, Amelia, OH (US); Jiaying Ma, Maplewood, MN (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/822,397

(22) Filed: Apr. 12, 2004

(65) Prior Publication Data

US 2004/0233393 A1 Nov. 25, 2004

Related U.S. Application Data

(63) Continuation of application No. 10/374,221, filed on Feb. 25, 2003, now Pat. No. 6,719,426.
(60) Provisional application No. 60/361,190, filed on Feb. 28, 2002.

(51) Int. Cl.[7] .............................................. G03B 21/14
(52) U.S. Cl. ......................................... 353/20; 353/81
(58) Field of Search ........................... 353/20, 31, 33, 353/81; 359/486, 494, 495, 496, 497, 831

(56) References Cited

U.S. PATENT DOCUMENTS

| 4,948,228 A | 8/1990 | Keens |
| 4,966,438 A | 10/1990 | Mouchart et al. |
| 5,327,270 A | 7/1994 | Miyatake |

(Continued)

FOREIGN PATENT DOCUMENTS

| EP | 0 492 636 A | 7/1992 |
| WO | WO 01/55783 A | 8/2001 |
| WO | WO 02/102087 A1 | 12/2002 |

OTHER PUBLICATIONS

E. Stupp and M. Brennesholtz, "Reflective polarizer technology," *Projection Displays*, 1999, p. 129–133.
Warren J. Smith, *Modern Optical Engineering*, 2$^{nd}$ edition, McGraw–Hill, Inc., New York, 1990, p. 99.
Private Line Display, vol. 7, No. 11, Jul. 20, 2001, pp. 6–8.

*Primary Examiner*—William C. Dowling
(74) *Attorney, Agent, or Firm*—George W. Jonas

(57) ABSTRACT

A compound polarization beam splitter (33) for use with a reflective, polarization-modulating, imaging device (10), e.g., a LCoS device, is provided. The compound PBS has: (a) an input prism (20); (b) an output prism (30), and (c) a polarizer (13), which is located between the two prisms (20,30) and which may be a wire grid polarizer (13a) or a multi-layer reflective polarizer (13b). Polarized illumination light (11) enters the input prism (20) through a first surface (21) and undergoes total internal reflection at a second surface (22) before being reflected from the polarizer (13) and polarization-modulated at the imaging device (10). The polarizer's tilt angle (β) is less than 45°, which reduces astigmatism and the required back working distance of the system's projection lens (74).

22 Claims, 5 Drawing Sheets

U.S. PATENT DOCUMENTS

| | | |
|---|---|---|
| 5,459,593 A | 10/1995 | Ootaki |
| 5,552,922 A | 9/1996 | Magarill |
| 5,576,854 A | 11/1996 | Schmidt et al. |
| 5,590,942 A | 1/1997 | Mitsutake et al. |
| 5,594,591 A | 1/1997 | Yamamoto et al. |
| 5,604,624 A | 2/1997 | Magarill |
| 5,965,247 A | 10/1999 | Jonza et al. |
| 5,986,815 A | 11/1999 | Bryars |
| 6,122,103 A | 9/2000 | Perkins et al. |
| 6,204,975 B1 | 3/2001 | Watters et al. |
| 6,320,628 B1 | 11/2001 | Tsujikawa et al. |
| 6,447,120 B1 | 9/2002 | Hansen et al. |
| 6,461,000 B1 | 10/2002 | Magarill |
| 6,486,997 B1 | 11/2002 | Bruzzone et al. |
| 6,487,021 B1 | 11/2002 | Ophey |
| 6,529,250 B1 | 3/2003 | Murakami et al. |
| 6,592,224 B2 | 7/2003 | Ito et al. |
| 6,778,228 B2 | 8/2004 | Murakami et al. |
| 2002/0180934 A1 | 12/2002 | Shimizu |
| 2003/0016334 A1 | 1/2003 | Weber et al. |
| 2003/0038923 A1 | 2/2003 | Aastuen et al. |
| 2003/0048423 A1 | 3/2003 | Aastuen et al. |
| 2003/0099008 A1 | 5/2003 | Cannon et al. |
| 2003/0112610 A1 | 6/2003 | Florence |

COMPOUND POLARIZATION BEAM SPLITTERS

CROSS REFERENCE TO RELATED APPLICATION

This application is a continuation of U.S. patent application Ser. No. 10/374,221, filed Feb. 25, 2003, now U.S. Pat. No. 6,719,426, which claims the benefit under 35 USC §119(e) of U.S. Provisional Application No. 60/361,190, filed Feb. 28, 2002. The contents of both of these patent applications are incorporated herein in their entirety.

FIELD OF THE INVENTION

This invention relates to optical assemblies (optical units) for the effective polarization separation of light. The assemblies can be used with, for example, reflective liquid crystal on silicon devices (LCoS devices).

More specifically, the invention relates to polarization separation devices known as polarization beam splitters (also referred to in the art as "polarized beam splitters," "polarizing beam splitters," or simply "PBSs") and, in particular, to polarization beam splitters for use in image projection systems which employ one or more reflective, polarization-modulating, imaging devices.

BACKGROUND OF THE INVENTION

A. Image Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIG. 1 shows in simplified form the basic components of an image projection system 77 for use with a microdisplay imaging device (also known in the art as a "digital light valve" or a "pixelized imaging device"). In this figure, 70 is an illumination system, which comprises a light source 71 and illumination optics 72 which transfer some of the light from the light source towards the screen, 73 is the imaging device, and 74 is a projection lens which forms an enlarged image of the imaging device on viewing screen 75.

For ease of presentation, FIG. 1 shows the components of the system in a linear arrangement. For a reflective imaging device of the type with which the present invention is concerned, the illumination system will be arranged so that light from that system reflects off of the imaging device, i.e., the light impinges on the front of the imaging device as opposed to the back of the device as shown in FIG. 1. Also, as shown in FIGS. 2 and 3, for a reflective imaging device which operates by modulating (changing) the polarization of portions of the illumination light (referred to herein as a "reflective, polarization-modulating, imaging device"), a polarization beam splitter (PBS) will be located in front of the imaging device and will receive illumination light 11, e.g., S-polarized light, from the illumination system and will provide imaging light 12, e.g., P-polarized light, to the projection lens.

For front projection systems, the viewer will be on the left side of screen 75 in FIG. 1, while for rear projection systems, the viewer will be on the right side of the screen. For rear projection systems housed in a cabinet, one or more mirrors are often used between the projection lens and the screen to fold the optical path and thus reduce the system's overall size.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image.

B. Polarization Beam Splitters

FIG. 2 shows a conventional layout for an image projection system employing a polarization beam splitter 60 of the MacNeille cube type. See, for example, E. Stupp and M. Brennesholtz, "Reflective polarizer technology," *Projection Displays*, 1999, p. 129–133. As shown in this figure, the polarization beam splitter (PBS) consists of two optically cemented right-angle prisms 61 and 62. The diagonal 63 of the splitter has a dielectric coating that reflects S-polarized light and transmits P-polarized light.

As can be seen in FIG. 2, after reflecting off of the diagonal of the MacNeille-type PBS, S-polarized light 14 from the illumination system reaches reflective imaging device 10, e.g., a LCoS device, where it is polarization modulated. The modulated light 15 is P-polarized and thus passes through diagonal 63 and on to the projection lens to form the desired image. Non-modulated light (not shown in FIG. 2), which is still S-polarized, reflects from the diagonal and is returned to the illumination system.

The main problem with using a MacNeille-type PBS in image projection systems is the depolarization of transmitted light that is caused by skew-ray effects. This is a purely geometrical phenomenon and is described in Miyatake, U.S. Pat. No. 5,327,270, which issued on Jul. 5, 1994, and is entitled "Polarizing Beam Splitter Apparatus and Light Valve Image Projection System."

This depolarized light reduces the contrast of the system. In accordance with the Miyatake patent, compensation of the skew-ray depolarization requires an additional quarter-wave plate (i.e., plate 64 in FIG. 2), which adds cost, requires precision alignment, and restricts the range of operating temperatures. Other disclosures of the use of compensating plates in projection systems employing reflective, polarization-modulating, imaging devices can be found in Ootaki, U.S. Pat. No. 5,459,593, Schmidt et al., U.S. Pat. No. 5,576,854, and Bryars, U.S. Pat. No. 5,986,815.

Another type of PBS is the wire grid polarizer. See, for example, Perkins et al., U.S. Pat. No. 6,122,103, which issued on Sep. 19, 2000, and is entitled "Broadband Wire Grid Polarizer for Visible Spectrum." This optical component does not suffer from skew-ray depolarization, and also has a very high polarization extinguish ratio. In addition, the component works over a large temperature range and can withstand a high light intensity. A wire grid polarizer 13a can be used with reflective, polarization-modulating, imaging devices, e.g., LCoS devices, in accordance with the component layouts shown schematically in FIGS. 3A and 3B. Unfortunately, both of these layouts suffer from optical problems.

The optical problem associated with the layout of FIG. 3A is that there is a tilted plano-parallel plate in the imaging optical path. The plate is the glass substrate (thickness greater than 0.5 mm) that supports the wire grid structure.

Currently, a technological limitation in the process that creates the wire grid structure makes the use of a thinner substrate difficult. A glass substrate 0.5 mm thick, tilted at 45 degrees creates astigmatism of −0.135 mm. See Warren J. Smith, *Modern Optical Engineering*, 2nd edition, McGraw-Hill, Inc., New York, 1990, page 99. The typical depth of focus of a projection lens used with a LCoS device is +/−0.025 mm (for an f-number ($F_{No}$) of 2.8). Therefore, the layout of FIG. 3A has unacceptable image quality due to astigmatism that is 2.5–3 times larger than the depth of focus.

In the layout of FIG. 3B, the light passes through the tilted glass substrate in the illumination path, where astigmatism is not critical. In this case, the image quality in the imaging path depends on the flatness of the wire grid substrate. Acceptable image quality requires the surface flatness to be about 1 fringe per inch or better. The best wire grid polarizers available today have a flatness of about 3 fringes per inch. There are also two other problems associated with the layout of FIG. 3B: (1) temperature deformation and (2) wire grid structure protection.

Typically, a LCoS projector is assembled and aligned at room temperature, but the operational temperature in the area of the LCoS (where the wire grid PBS is located) is 45–55 degrees Celsius. This elevated temperature can create deformation of the wire grid substrate, which will degrade the image quality on the screen.

As to the protection problem, the wire grid structure should be protected from environmental dust, humidity, mechanical scratches, etc., which will reduce the polarization properties of the PBS. But any kind of protective window applied in front of the grid structure in the configuration of FIG. 3B will essentially reintroduce a plano-parallel plate into the imaging path, which will create astigmatism as discussed above.

Another known type of PBS is a multi-layer reflective polarizer. See, for example, Jonza, et al., U.S. Pat. No. 5,965,247, the contents of which are incorporated herein by reference. See also Private Line Report on Projection Display, Volume 7, No. 11, Jul. 20, 2001, pages 6–8.

Like wire grid polarizers, multi-layer reflective polarizers fall into the general class of Cartesian polarizers in that the polarization of the separate beams is referenced to the invariant, generally orthogonal, principal axes of the polarizer so that, in contrast with a MacNeille-type PBS, the polarization of the separate beams is substantially independent of the angle of incidence of the beams. See Bruzzone et al., U.S. Pat. No. 6,486,997, the contents of which are incorporated herein by reference.

FIG. 3C schematically shows a layout for using a multi-layer reflective polarizer 13*b* with a reflective, polarization-modulating, imaging device 10, e.g., a LCoS device. Multi-layer reflective polarizers are relatively thick components and, as shown in FIG. 3C, are tilted at an angle of 45 degrees.

The thickness of this component in combination with the difference in refractive index between the component and the surrounding glass prisms 51 and 52 creates astigmatism, which degrades the display's image quality. For example, a multi-layer reflective polarizer can have a thickness and index of refraction of 0.25 millimeters and 1.54, respectively, while the index of refraction of prisms 51 and 52, when composed of PBH-56 glass, is approximately 1.85. When tilted at 45°, such an arrangement creates astigmatism of approximately 0.2 mm. To correct this astigmatism, a plano-parallel plate 50 (astigmatism corrector) having a high index of refraction (e.g., approximately 1.93 for PBH-71 glass) can be used next to the multi-layer reflective polarizer as shown in FIG. 3C. However, the use of such an astigmatism corrector significantly increases the cost of the PBS.

SUMMARY OF THE INVENTION

In view of the foregoing, there exists a need in the art for polarization beam splitters which have some and preferably all of the following properties:

(1) the PBS is easy to manufacture and does not require thin or ultra-flat substrates;

(2) the PBS is environmentally protected;

(3) the PBS is not subject to deformation at elevated temperatures; and (4) the PBS does not introduce substantial levels of astigmatism into the image light.

As an additional fifth property, the optical path through the PBS for imaging light is preferably short so that the projection lens which forms the ultimate image can have a shorter back focal length and thus a simpler and less expensive construction.

To satisfy this need in the art, the invention provides polarization beam splitters for use with reflective, polarization-modulating, imaging panels which have some and preferably all of the above five features.

In particular, in accordance with a first aspect, the invention provides an image projection system (77) comprising:

(I) an illumination system (70) which produces polarized illumination light (11) having a first polarization direction (preferably, S-polarization);

(II) a reflective imaging device (10) which receives polarized illumination light (11) and produces modulated reflected light by changing the polarization direction of selected portions of the received light to a second polarization direction (preferably, P-polarization);

(III) a projection lens (74); and (IV) a prism assembly (33) which comprises an input prism (20), an output prism (30), and a polarizer (13) between the input (20) and output (30) prisms, wherein:

(A) the input prism (20) comprises:
  (i) a first surface (21) which receives polarized illumination light (11) from the illumination system (70);
  (ii) a second surface (22) which provides polarized illumination light (11) to the imaging device (10) and receives modulated reflected light from the imaging device (10); and
  (iii) a third surface (23) which faces the output prism (30);

(B) the output prism (30) comprises:
  (i) a first surface (31) which faces the input prism (20) and is parallel to the third surface (23) of the input prism (20); and
  (ii) a second surface (32) which provides light to the projection lens (74) to form a projected image; and (C) the polarizer (13):
  (i) is between the third surface (23) of the input prism (20) and the first surface (31) of the output prism (30); and
  (ii) reflects light having the first polarization direction and transmits light having the second polarization direction;

wherein the polarized illumination light (11) has an optical path which comprises:
(i) inward transmission through the first surface (21) of the input prism (20);
(ii) total internal reflection at the second surface (22) of the input prism (20);
(iii) outward transmission through the third surface (23) of the input prism (20);
(iv) reflection from the polarizer (13);
(v) inward transmission through the third surface (23) of the input prism (20); and
(vi) outward transmission through the second surface (22) of the input prism (20).

In accordance with a second aspect, the invention provides a prism assembly (33) which comprises an input prism (20), an output prism (30), and a polarizer (13) between the input (20) and output (30) prisms, where:
(A) the input prism (20) comprises:
(i) a first surface (21) which is configured and arranged to receive polarized illumination light (11) from an illumination system (70);
(ii) a second surface (22) which is configured and arranged to provide polarized illumination light (11) to an imaging device (10) and to receive modulated reflected light from the imaging device (10); and
(iii) a third surface (23) which faces the output prism (30);
(B) the output prism (30) comprises:
(i) a first surface (31) which faces the input prism (20) and is parallel to the third surface (23) of the input prism (20); and
(ii) a second surface (32) which is configured and arranged to provide light to a projection lens (74) to form a projected image; and
(C) the polarizer (13):
(i) is between the third surface (23) of the input prism (20) and the first surface (31) of the output prism (30); and
(ii) reflects light having a first polarization direction and transmits light having a second polarization direction;
wherein the polarized illumination light (11) has an optical path which comprises:
(i) inward transmission through the first surface (21) of the input prism (20);
(ii) total internal reflection at the second surface (22) of the input prism (20);
(iii) outward transmission through the third surface (23) of the input prism (20);
(iv) reflection from the polarizer (13);
(v) inward transmission through the third surface (23) of the input prism (20); and
(vi) outward transmission through the second surface (22) of the input prism (20).

In accordance with a third aspect, the invention provides a method for producing an image using a polarizer (13) which reflects light of a first polarization (preferably, S-polarization) and transmits light of a second polarization (preferably P-polarization), said method comprising in order:
(1) providing polarized illumination light (11) having a first polarization direction (preferably, S-polarization);
(2) introducing the polarized illumination light into a prism (20) having a plurality of surfaces (21,22,23);
(3) changing the direction of the polarized illumination light through total internal reflection at one of the prism's surfaces (22);
(4) reflecting the polarized illumination light from the polarizer (13);
(5) modulating the polarization of the polarized illumination light at a reflective imaging device (10) by changing the polarization of selected portions of that light to the second polarization, said selected portions comprising the light which forms the image; and
(6) transmitting the selected portions through the polarizer (13) and to a projection lens (74) to form the image.

In accordance with a fourth aspect, the invention provides a method for producing an image using a polarizer (13) which reflects light of a first polarization (preferably, S-polarization) and transmits light of a second polarization (P-polarization), said method comprising in order:
(1) providing polarized illumination light having the second polarization direction (e.g., imaging light 12 propagated in the opposite direction in FIG. 6);
(2) transmitting the polarized illumination light through the polarizer (13);
(3) modulating the polarization of the polarized illumination light at a reflective imaging device (10) by changing the polarization of selected portions of that light to the first polarization, said selected portions comprising the light which forms the image;
(4) reflecting the selected portions having the first polarization from the polarizer (13) to form image light (e.g., illumination light 11 propagated in the opposite direction in FIG. 6);
(5) introducing the image light into a prism (20) having a plurality of surfaces (21,22,23);
(6) changing the direction of the image light through total internal reflection at one of the prism's surfaces (22); and
(7) transmitting the image light to a projection lens (74) to form the image.

In accordance with each of these aspects of the invention, the polarizer is preferably either a wire grid polarizer (13a) or a multi-layer reflective polarizer (13b).

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

BRIEF DESCRIPTION OF THE DRAWINGS

In the above drawings, like reference numbers designate like or corresponding parts throughout the several views. The elements to which the reference numbers generally correspond are set forth in Table 1.

DESCRIPTION OF THE PREFERRED EMBODIMENTS

As discussed above, the present invention relates to a prism assembly which utilizes the excellent polarization properties of Cartesian polarizers, including wire grid polarizers and multi-layer reflective polarizers, and can be used with, for example, a LCoS-based projection system with the following advantages:

(1) no special requirements are imposed on the wire grid substrate, specifically, no thickness restrictions and no need for ultra-flatness;

(2) complete environmental protection is provided for the wire grid structure;

(3) there is no potential for deformation of the polarizer at elevated temperatures;

(4) in the case of multi-layer reflective polarizers, the system has significantly reduced astigmatism thus reducing or eliminating the need for an astigmatism corrector; and (5) the imaging optical path inside of the prism assembly has reduced length compared to conventional PBSs.

Figure 1:
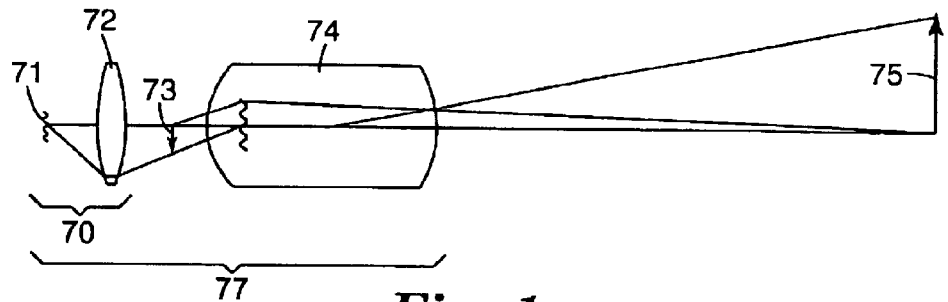
FIG. 1 is a schematic diagram showing the basic components of an image projection system employing a microdisplay imaging device.
Figure 2:
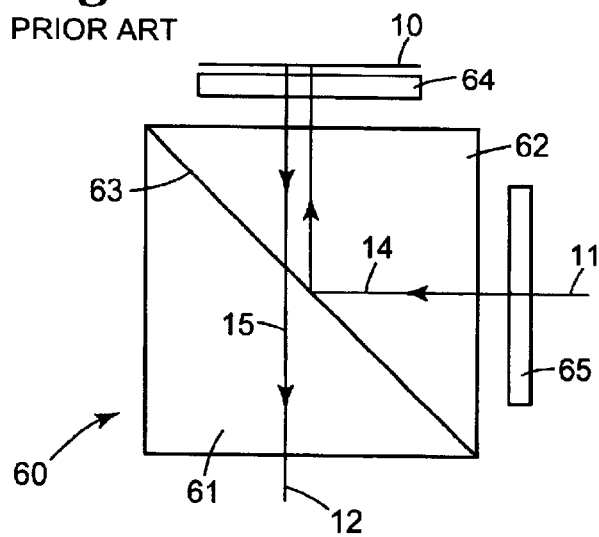
FIG. 2 is a schematic drawing of an optical layout for an image projection system employing a reflective, polarization-modulating, imaging device and a conventional PBS of the MacNeille cube type.
Figure 3A:
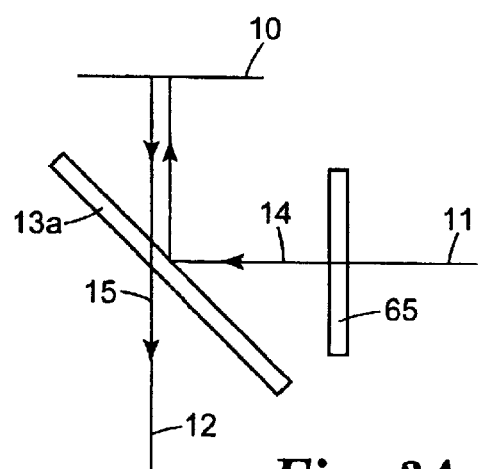
FIG. 3A is a schematic drawing of a first optical layout for an image projection system employing a reflective, polarization-modulating, imaging device and a wire grid PBS.
Figure 3B:
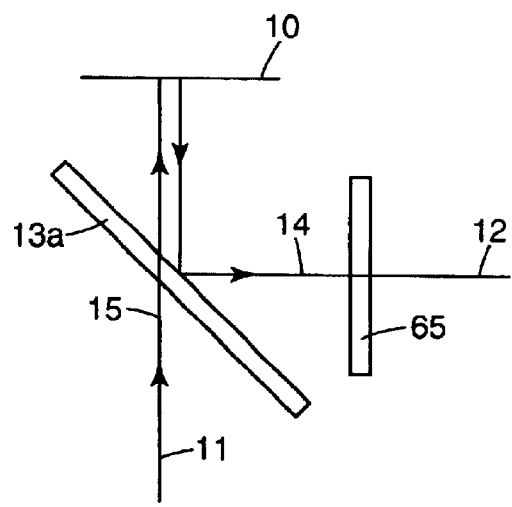
FIG. 3B is a schematic drawing of a second optical layout for an image projection system employing a reflective, polarization-modulating, imaging device and a wire grid PBS.
Figure 3C:
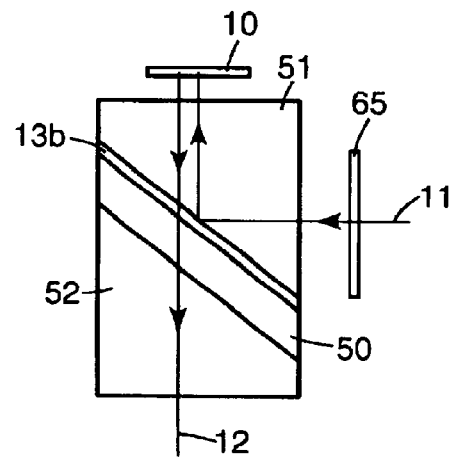
FIG. 3C is a schematic drawing of an optical layout for an image projection system employing a reflective, polarization-modulating, imaging device and a multi-layer reflective polarizer.
Figure 4:
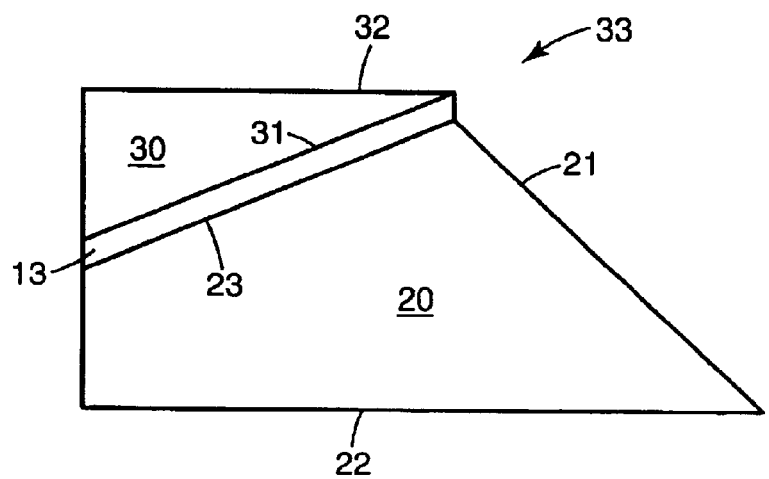
FIG. 4 is a schematic drawing of a compound polarization beam splitter (PBS) assembly of the present invention.

In broadest terms, the invention is a compound prism consisting of two prisms 20 and 30, e.g., two glass prisms, and a polarizer 13, e.g., a wire grid polarizer or a multi-layer reflective polarizer, as shown in FIG. 4.

Figure 5A:
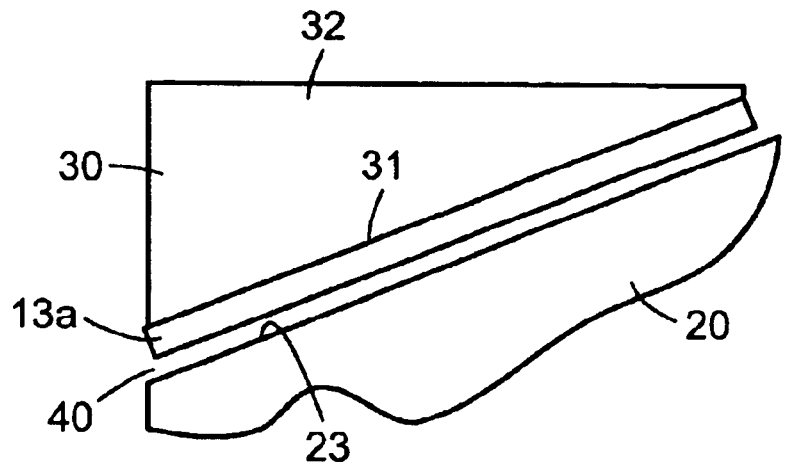
FIG. 5A is a schematic drawing showing a wire grid polarizer at a first position in the compound PBS assembly of FIG. 4.

Beginning with the case of a wire grid polarizer, as shown in FIG. 5A, wire grid polarizer 13*a* can be optically cemented to the long side 31 (i.e., first surface) of output prism 30 with the grid structure facing away from prism 30. Output prism 30 is then positioned so that there is a small air gap 40 between surface 23 (i.e., the third surface) of input prism 20 and the wire grid structure. This could be accomplished using a thin spacer between the wire grid and surface 23 to guarantee the desired clearance.

The air gap between surface 23 and the wire grid structure is preferably less that 100 microns, which is small enough that the astigmatism it causes does not degrade the image quality. Most preferably, the air gap is less than 50 microns. The spacer that creates this air gap can be a double-sided adhesive film or a layer of material deposited in vacuum or any other type of mechanical layer to provide a uniform thickness for this gap. Glass beads suspended in an adhesive can also be used as the spacer. The spacer can be continuous along all edges of the wire grid polarizer to provide environmental insulation (isolation) of the air gap. Alternatively, this environmental insulation (isolation) can be provided by paint or a mechanical film applied around the air gap on the outside surfaces of the compound prism.

Figure 6:
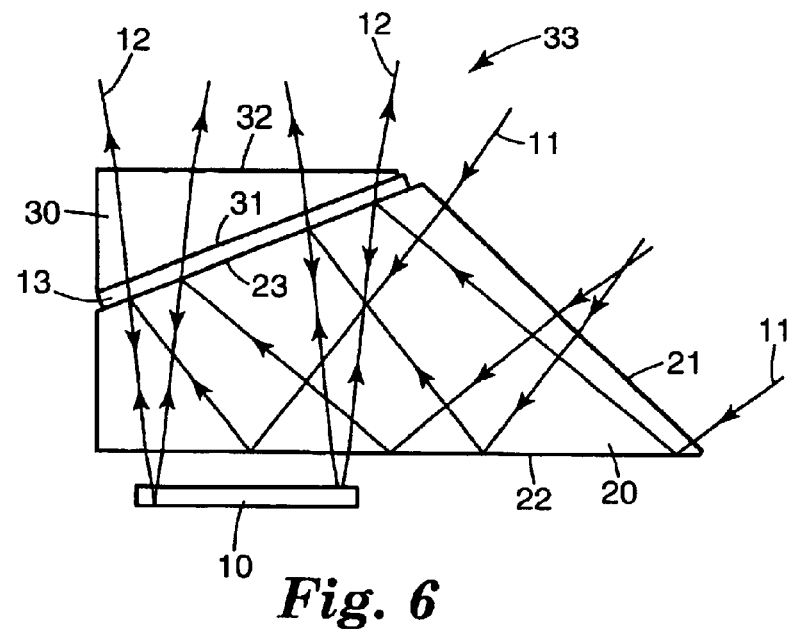
FIG. 6 is a schematic drawing in which light rays have been traced through the compound PBS assembly of FIG. 4.

Raytracing through the compound prism is shown in FIG. 6. Polarized light 11 (S-polarization) from the illumination system enters prism assembly 33 through surface 21 (the first surface) of input prism 20, experiences total internal reflection (TIR) from surface 22 (the second surface) of that prism, and then reaches the polarizer. The wire grid structure reflects S polarization towards the LCoS (or other polarizing, reflective, pixelized imaging device) as shown. Light reflected from the "off" pixels of the LCoS has the same polarization and goes backwards into the illumination system. Light reflected from the "on" pixels changes polarization upon reflection and passes through the polarizer into the projection lens. The same light paths and polarization changes occur for the multi-layer reflective polarizer embodiments of the invention discussed below.

To minimize scattering and/or reflection, the non-optical surfaces of the input and/or output prisms can be tilted and/or moved outward from their positions shown in FIG. 6. For example, the left hand face of output prism 30 can be rotated in a clockwise direction in FIG. 6 and moved outward by extending surface 31 so as to minimize the scattering and/or reflection of imaging light passing through this prism.

Figure 8:
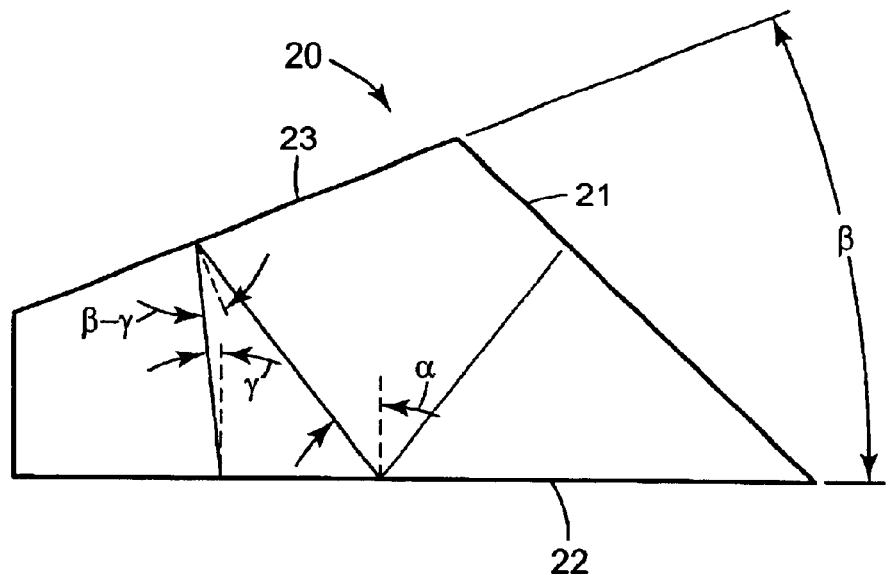
FIG. 8 is a schematic drawing illustrating the calculation of $\beta_{min}$.
Figure 9:
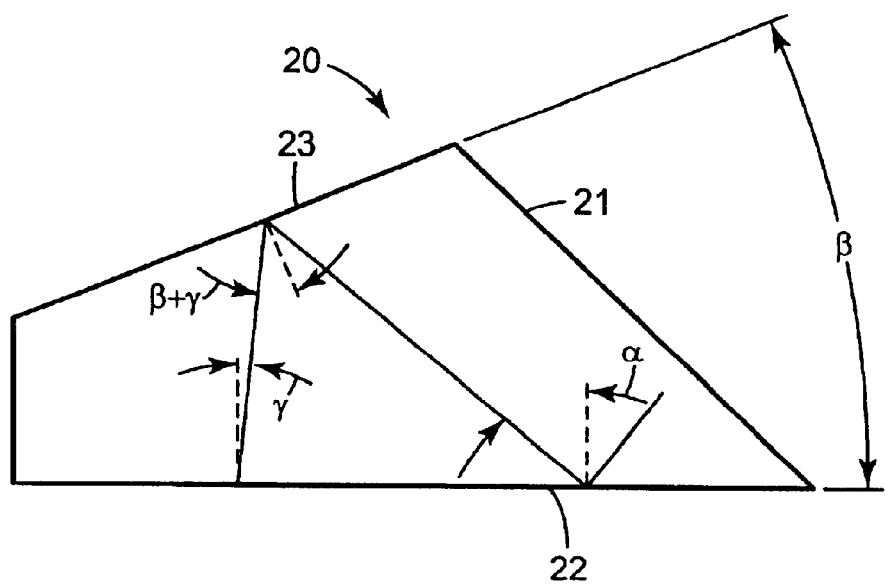
FIG. 9 is a schematic drawing illustrating the calculation of $\beta_{max}$.

With reference to FIGS. 8 and 9, angle β of prism 20 should be chosen to be between $\beta_{min}$ and $\beta_{max}$ which can be determined as follows:

(1) Angle $\beta_{min}$ should provide total internal reflection from surface 22 of prism 20 for all rays within a given aperture. FIG. 8 shows the marginal ray that has the smallest angle of incidence on surface 22 of prism 20. If that ray undergoes total internal reflection it means that all rays within aperture ±γ will have TIR. From FIG. 8 it can be found that:

$$\beta = 0.5 \cdot (\gamma + \alpha)$$

where:

$$\gamma = \sin^{-1}(1/(2 \cdot n_1 \cdot F_{No})),$$

$$\alpha = \sin^{-1}(1/n_1),$$

$n_1$ is the index of refraction of prism 20, and
$F_{No}$ is the f-number of the projection lens.

Accordingly, if $\beta \geq 0.5 \cdot (\gamma + \alpha)$, then all rays within aperture ±γ will undergo total internal reflection at surface 22.

(2) Angle $\beta_{max}$ is chosen to prevent total internal reflection from surface 23 of prism 20 for all rays within a given aperture. The marginal ray, which should be taken into consideration, is shown in FIG. 9. If angle (β+γ) is less than the angle of TIR, then all rays within the given aperture will pass through surface 23 and will interact with the wire grid structure of the polarizer. Accordingly, to avoid total internal reflection at surface 23 for all rays within aperture ±γ, the following relationship should be satisfied:

$$\beta \leq \alpha - \gamma.$$

The following numerical example illustrates the calculation of $\beta_{min}$ and $\beta_{max}$ for a representative prism material and projection lens f-number:

(1) material of prism: glass SF2, n=1.65222, angle of TIR=37.25°;
(2) aperture in air of ±10° which corresponds to γ=±6.03° in glass;
(3) the smallest value for angle $\beta_{min}$ when angle α is equal to the TIR angle is:

$$\beta_{min}=0.5\times(6.03+37.25)=21.64°$$

(4) the largest value for angle $\beta_{max}$ when the angle (β+γ) is equal to the TIR angle is:

$$\beta_{max}=37.25-6.02=31.22°$$

From a practical point of view it is better to have angle β smaller because it leads to lower levels of astigmatism when a multi-layer reflective polarizer having a low index of refraction compared to that of prisms 20 and 30 is used (see below).

In the above calculations, the aperture angle of ±10° in air is based on the typical f-number (2.8) for optical systems employing LCoS devices. Other aperture angles can, of course, be used for LCoS systems. Similarly, the same or different aperture angles can be used for other systems employing polarizing, reflective, pixelized imaging devices other than LCoS devices.

It is important to understand that surface 21 of the prism 20 (see FIG. 4) is the mirror reflection of surface 23 from surface 22. In the illumination optical path, prism 20 works as a plano-parallel plate and does not create any distortion of the illumination beam. It is also important to understand that surfaces 32 and 22 are parallel to each other so that there is no beam distortion in the imaging light path. These considerations also apply to the multi-layer reflective polarizer embodiments of the invention discussed below.

Prism 20 is preferably made of a low birefringence material to maintain the polarization contrast of the system. Special glasses (e.g., SF57, PBH56) with low photo-elastic constants can be used or a less expensive glass (such as SF2) can be used in combination with an annealing process to reduce internal stresses. Prism 30 can also be made of special glass or an annealed glass, but can be made of other, less expensive, glasses if desired since the polarization state of the light which passes through this prism is not important. Again, these considerations also apply to the multi-layer reflective polarizer embodiments of the invention discussed below.

A prism assembly having a wire grid polarizer positioned as in FIG. 5A was prepared and tested and found to exhibit a contrast level of approximately 200:1. To achieve higher contrast levels, phase control/anti-reflection coatings can be used on surface 23 to compensate for the depolarization of light and associated phase shift produced by this tilted glass/air interface. The use of such coatings in connection with the Philips-type prisms used with LCoS imagers has previously been described. See, for example, Yamamoto et al., U.S. Pat. No. 5,594,591. See also Keens, U.S. Pat. No. 4,948,228 and the Essential Macleod software program available from the Thin Film Center, Tucson, Ariz.

The contrast can also be improved by employing phase control coatings on TIR surface 22. Again, these coatings can be of the type previously disclosed for use with Philips-type prisms. Table 2 sets forth the refractive indices and thickness of a suitable phase control coating for use with PBH-56 glass (the substrate) and a β angle of 21°. Similar coatings can be used with other glasses and prism angles.

Figure 5B:
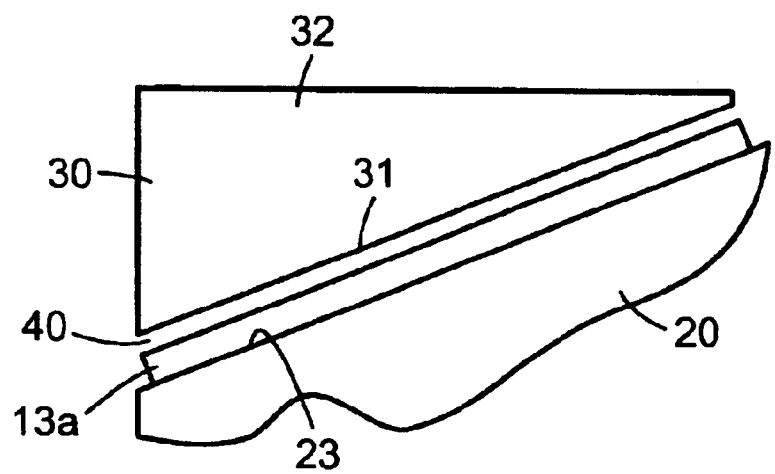
FIG. 5B is a schematic drawing showing a wire grid polarizer at a second position in the compound PBS assembly of FIG. 4.

In addition to these coatings, enhanced contrast can be achieved by moving wire gird polarizer 13a to surface 23 of prism 20, as shown in FIG. 5B. The wire grid structure in this case will face air gap 40, which is now adjacent to prism 30, rather than prism 20 as in FIG. 5A. The same approaches discussed above in connection with FIG. 5A can be used to produce air gap 40 for the FIG. 5B configuration and to environmentally isolate that gap once formed.

By using an index matching optical cement between the substrate of wire grid polarizer 13a and prism 20, the interface between the polarizer and prism 20 can be made invisible for the embodiment of FIG. 5B. In this way, the depolarization that occurs when polarized light passes through a tilted interface is avoided. Even residual stress in the wire grid substrate is not critical because this substrate is thin and birefringence induced by this residual stress is not significant. It should be noted that when the interface between the polarizer and prism is made invisible, the considerations regarding TIR at this interface, i.e., the considerations leading to the calculation of $\beta_{max}$, no longer apply and thus β only needs to be greater than or equal to 0.5·(γ+α). However, as discussed above, β is preferably kept as small as possible, e.g., just above $\beta_{min}$.

Although the foregoing discussion has been in terms of a wire grid polarizer, it should be noted that the compound prism structure of the invention can be used with other types of polarizers. In particular, the compound prism structure can be used with polarizing birefringence films such as those manufactured by the 3M Company. Examples of polarizing beam splitters using such films can be found in U.S. Pat. No. 6,486,997, U.S. Patent Publication No. 2003 0016334, PCT Patent Publication No. WO 02/102,087, U.S. patent application Ser. No. 09/878,559, and U.S. patent application Ser. No. 10/159,694, the contents of each of which is hereby incorporated herein by reference.

When such a multi-layer reflective polarizer is used, it replaces the wire grid and its substrate. More specifically, the film is mounted between prism 20 and prism 30 of FIG. 4. For this embodiment, air gap 40 shown in FIG. 5 is eliminated and thus the film (or optical cement used to mount the film) touches both surface 23 of prism 20 and surface 31 prism 30. Because the air gap is eliminated, the locations of the illumination system and the projection lens shown in FIG. 6 can be readily interchanged for this embodiment (see the fourth general aspect of the invention set forth in the Summary of the Invention). As discussed above, the illumination system is preferably designed to produce S-polarized light and thus for both the wire grid and the polarizing film embodiments, the grid or film, as the case may be, is oriented so that it reflects S-polarization from the illumination system, i.e., it is oriented to produce the raytracing of FIG. 6 for S-polarized illumination light 11.

As with the wire grid polarizer embodiments, an optical cement is used to mount the multi-layer reflective polarizer to prisms 20 and 30. Where there is a significant difference between the refractive index of the prism glass and the refractive index of the polymer film(s) making up the multi-layer reflective polarizer, the diagonal surfaces of prism 20 and prism 30 should have matching anti-reflection (AR) coatings to minimize Fresnel reflections.

As with the wire grid polarizer embodiments, TIR surface 22 preferably includes a phase control coating to compensate for the phase shift which occurs when polarized light undergoes total internal reflection. As with the FIG. 5B wire grid embodiment of the invention, only the $\beta_{min}$ limitation applies to the multi-layer reflective polarizer embodiments since the interface between the multi-layer reflective polarizer and prism 20 is preferably made optically invisible.

The value of having β as small as possible to minimize astigmatism effects introduced by a multi-layer reflective polarizer is illustrated by the following numerical example:

Material for prisms 20 and 30—PBH-56 ($n_d$=1.8414);

Multi-layer reflective polarizer—3M Cartesian polarizing film ($n_d$=1.545, thickness 0.37 mm);

LCoS imager dimensions—10.55×18.76 mm;

Effective f-number of projection lens—2.0.

Table 3 shows the axial astigmatism produced by a tilted plane-parallel plate of index 1.545 in a surrounding media of index 1.8414. The last row of the table shows the minimum thickness along the imaging light path for a given angle of the prism diagonal, and the last column gives reference data for a conventional PBS with a 45° diagonal.

As can be seen in this table, smaller values of the diagonal tilt, i.e., smaller values of β, result in significantly smaller levels of axial astigmatism. Although the minimum thickness increases somewhat at the smaller β values, it is still well below the thickness required when a conventional 45° PBS is used.

The contrast achieved by some polarizers, including multi-layer reflective polarizers, depends on the angle at which incident light impinges on the polarizer. If the angle of incidence becomes too small, contrast can drop below acceptable levels, e.g., below 1000:1. This drop off is generally color dependent with, for example, the greatest reduction in contrast occurring for short wavelength light, i.e., blue light. Accordingly, although small values of β are preferred, β should not be made so small that the contrast of the system becomes unacceptable. Preferably, β should satisfy the following relationship:

$$\beta \geq \gamma + \theta,$$

where γ is as defined above and θ is the minimum angle of incidence that provides a contrast of 1000:1.

To compensate for residual astigmatism induced by the tilted media of the compound prism, i.e., the materials comprising the polarizer and any other materials located between prisms 20 and 30, surface 32 of prism 30 and/or surface 22 of prism 20 can have a cylindrical shape.

Figure 7:
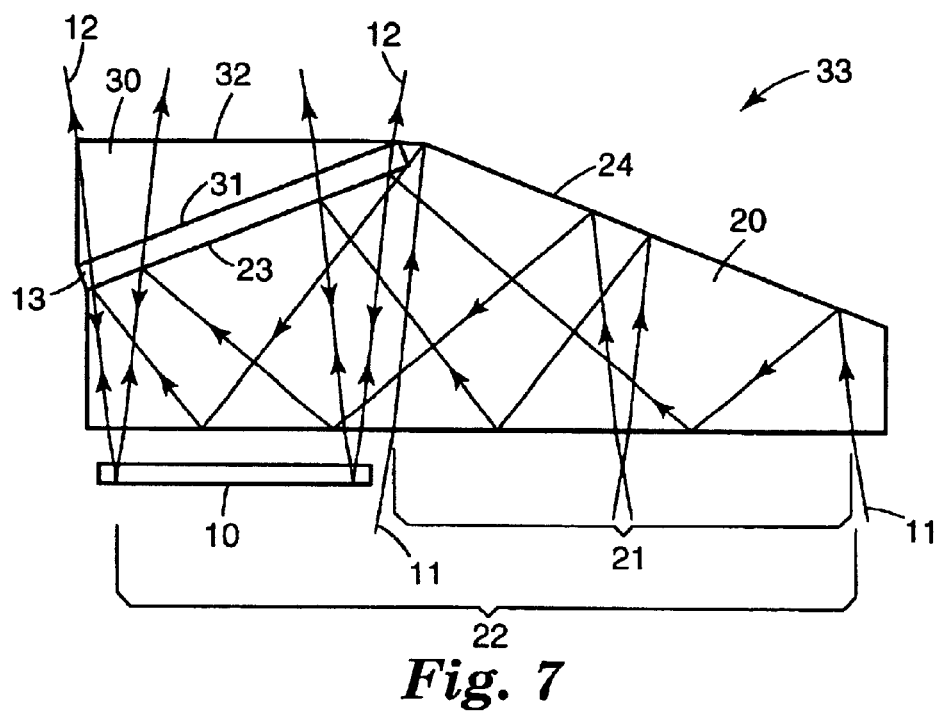
FIG. 7 is a schematic drawing in which light rays have been traced through a compound PBS assembly of the invention which includes an additional fold in the illumination path beyond those of FIG. 4.

FIG. 7 shows an alternate embodiment of the invention in which the compound prism can have an additional reflective surface 24 (the fourth surface) to fold the illumination beam. In this case, first surface 21 is a portion of second surface 22, as shown in FIG. 7. Alternatively, the additional fold can be arranged in an orthogonal direction to the plane of FIG. 7 for the case where the incoming illumination beam is in the plane of the imaging device and perpendicular to the imaging beam.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Number | Element |
|---|---|
| 10 | reflective, polarization-modulating, imaging device |
| 11 | light from illumination system |
| 12 | light to projection lens |
| 13 | Cartesian polarizer |
| 13a | wire grid Cartesian polarizer |
| 13b | multi-layer reflective Cartesian polarizer |
| 14 | S-polarized light |
| 15 | P-polarized light |
| 20 | input prism |
| 21 | first surface of input prism |
| 22 | second surface of input prism |
| 23 | third surface of input prism |
| 24 | fourth surface of input prism |
| 30 | output prism |
| 31 | first surface of output prism |
| 32 | second surface of output prism |
| 33 | prism assembly |
| 40 | air gap |
| 50 | astigmatism corrector |
| 51 | prism |
| 52 | prism |
| 60 | conventional PBS |
| 61 | right angle prism |
| 62 | right angle prism |
| 63 | PBS diagonal |
| 64 | quarter wave plate |
| 65 | clean-up polarizer |
| 70 | illumination system |
| 71 | light source |
| 72 | illumination optics |
| 73 | microdisplay imaging device |
| 74 | projection lens |
| 75 | viewing screen |
| 77 | image projection system |

TABLE 2

| Layer | Refractive Index | Thickness (nanometers) |
|---|---|---|
| Substrate | 1.842 | |
| 1 | 1.4648 | 24.49 |
| 2 | 2.3443 | 19.31 |
| 3 | 1.4648 | 51.75 |
| 4 | 2.3443 | 19.65 |
| 5 | 1.4648 | 204.14 |
| 6 | 2.3443 | 27.13 |
| 7 | 1.4648 | 2.62 |
| 8 | 2.3443 | 82.86 |
| 9 | 1.4648 | 195.83 |
| 10 | 2.3443 | 19.24 |
| 11 | 1.4648 | 108.44 |
| Air | 1 | |

TABLE 3

| | | | | |
|---|---|---|---|---|
| diagonal tilt (degrees) | 22 | 25 | 30 | 45 |
| axial astigmatism (mm) | 0.020 | 0.028 | 0.049 | 0.323 |
| minimum thickness (mm) | 13 | 12.6 | 9.8 | 15 |

What is claimed is:

1. A prism assembly which comprises an input prism, an output prism, and a polarizer between the input and output prisms, wherein:

(A) the input prism comprises:

(i) a first surface which receives polarized illumination light from an illumination system;

(ii) a second surface which is configured and arranged to provide polarized illumination light to an imaging device and to receive modulated reflected light from the imaging device, wherein the first surface and the second surface are along a same side of the input prism; and
  (iii) a third surface which faces the output prism;
(B) the output prism comprises:
  (i) a first surface which faces the third surface of the input prism; and
  (ii) a second surface which is configured and arranged to provide light to a projection lens to form a projected image; and
(C) the polarizer:
  (i) is between the third surface of the input prism and the first surface of the output prism; and
  (ii) reflects light having a first polarization direction and transmits light having a second polarization direction;
wherein the polarized illumination light has an optical path which comprises:
  (i) inward transmission through the first surface of the input prism;
  (ii) total internal reflection at the second surface of the input prism;
  (iii) outward transmission through the third surface of the input prism;
  (iv) reflection from the polarizer;
  (v) inward transmission through the third surface of the input prism; and
  (vi) outward transmission through the second surface of the input prism.

2. The prism assembly of claim 1 wherein the second surfaces of the input and output prisms are parallel.

3. The prism assembly of claim 1 wherein the polarizer is a Cartesian polarizer.

4. The prism assembly of claim 1 wherein the polarizer is a wire grid polarizer.

5. The prism assembly of claim 1 wherein the polarizer is a multi-layer reflective polarizer.

6. The prism assembly of claim 1 wherein the second surface of the input prism comprises a coating for compensating for phase variations in the polarized illumination light which result from the total internal reflection of that light at the second surface.

7. The prism assembly of claim 1 wherein the polarizer is air spaced from the third surface of the input prism and the third surface comprises a coating for compensating for phase variations in the polarized illumination light which result from the transmission of that light through that surface.

8. The prism assembly of claim 1 wherein the input prism further comprises a fourth surface at which the polarized illumination light undergoes reflection before undergoing total internal reflection at the second surface.

9. A prism assembly which comprises an input prism, an output prism, and a wire grid polarizer between the input and output prisms, wherein:
(A) the input prism comprises:
  (i) a first surface which receives polarized illumination light from an illumination system;
  (ii) a second surface which is configured and arranged to provide polarized illumination light to an imaging device and to receive modulated reflected light from the imaging device; and
  (iii) a third surface which faces the output prism;
(B) the output prism comprises:
  (i) a first surface which faces the third surface of the input prism; and
  (ii) a second surface which is configured and arranged to provide light to a projection lens to form a projected image; and
(C) the wire grid polarizer:
  (i) is between the third surface of the input prism and the first surface of the output prism; and
  (ii) reflects light having a first polarization direction and transmits light having a second polarization direction;
wherein the polarized illumination light has an optical path which comprises:
  (i) inward transmission through the first surface of the input prism;
  (ii) total internal reflection at the second surface of the input prism;
  (iii) outward transmission through the third surface of the input prism;
  (iv) reflection from the wire grid polarizer;
  (v) inward transmission through the third surface of the input prism; and
  (vi) outward transmission through the second surface of the input prism.

10. The prism assembly of claim 9 wherein the second surface of the input prism comprises a coating for compensating for phase variations in the polarized illumination light which result from the total internal reflection of that light at the second surface.

11. The prism assembly of claim 9 wherein the wire grid polarizer is air spaced from the third surface of the input prism and the third surface comprises a coating for compensating for phase variations in the polarized illumination light which result from the transmission of that light through that surface.

12. The prism assembly of claim 9 wherein the input prism further comprises a fourth surface at which the polarized illumination light undergoes reflection before undergoing total internal reflection at the second surface.

13. The prism assembly of claim 9, wherein the wire grid polarizer is disposed on the third surface of the input prism.

14. The prism assembly of claim 9, wherein the wire grid polarizer is disposed on the first surface of the output prism.

15. A prism assembly which comprises an input prism, an output prism, and a polarizer between the input and output prisms, wherein:
(A) the input prism comprises:
  (i) a first surface which receives polarized illumination light from an illumination system;
  (ii) a second surface which is configured and arranged to provide polarized illumination light to an imaging device and to receive modulated reflected light from the imaging device;
  (iii) a third surface which faces the output prism; and
  (iv) a phase control coating disposed on the second surface to compensate for phase variations in the polarized illumination light produced at the second surface;
(B) the output prism comprises:
  (i) a first surface which faces the third surface of the input prism; and
  (ii) a second surface which is configured and arranged to provide light to a projection lens to form a projected image; and
(C) the polarizer:
  (i) is between the third surface of the input prism and the first surface of the output prism; and
  (ii) reflects light having a first polarization direction and transmits light having a second polarization direction;

wherein the polarized illumination light has an optical path which comprises:
- (i) inward transmission through the first surface of the input prism;
- (ii) total internal reflection at the second surface of the input prism;
- (iii) outward transmission through the third surface of the input prism;
- (iv) reflection from the polarizer;
- (v) inward transmission through the third surface of the input prism; and
- (vi) outward transmission through the second surface of the input prism.

16. The prism assembly of claim 15 wherein the polarizer is air spaced from the third surface of the input prism and the third surface comprises a coating for compensating for phase variations in the polarized illumination light which result from the transmission of that light through that surface.

17. The prism assembly of claim 15 wherein the polarizer is a Cartesian polarizer.

18. The prism assembly of claim 15 wherein the polarizer is a multi-layer reflective polarizer.

19. An image projection system comprising:
- (I) an illumination system which produces linearly polarized illumination light having a first polarization direction;
- (II) a reflective imaging device which receives linearly polarized illumination light and produces modulated reflected light by changing the linear polarization direction of selected portions of the received light to a second linear polarization direction;
- (III) a projection lens; and
- (IV) a prism assembly which comprises an input prism, an output prism, and a polarizer between the input and output prisms, wherein:
- (A) the input prism comprises:
  - (i) a first surface which receives linearly polarized illumination light from the illumination system;
  - (ii) a second surface which provides linearly polarized illumination light to the imaging device and receives modulated reflected light from the imaging device; and
  - (iii) a third surface which faces the output prism;
- (B) the output prism comprises:
  - (i) a first surface which faces the third surface of the input prism; and
  - (ii) a second surface which provides light to the projection lens to form a projected image; and
- (C) the polarizer:
  - (i) is between the third surface of the input prism and the first surface of the output prism; and
  - (ii) reflects light having the first linear polarization direction and transmits light having the second linear polarization direction;

wherein the linearly polarized illumination light has an optical path which comprises:
- (i) inward transmission through the first surface of the input prism;
- (ii) total internal reflection at the second surface of the input prism;
- (iii) outward transmission through the third surface of the input prism;
- (iv) reflection from the polarizer;
- (v) inward transmission through the third surface of the input prism; and
- (vi) outward transmission through the second surface of the input prism.

20. The prism assembly of claim 19 wherein the polarizer is a Cartesian polarizer.

21. The prism assembly of claim 19 wherein the polarizer is a wire grid polarizer.

22. The prism assembly of claim 19 wherein the second surface of the input prism comprises a coating for compensating for phase variations in the linearly polarized illumination light which result from the total internal reflection of that light at the second surface.

* * * * *